United States Patent Office 3,453,312
Patented July 1, 1969

3,453,312
[β - (SUBSTITUTED-THIO) - ACYLPHENOXY]-ALKANOIC ACIDS AND [β-(SUBSTITUTED-THIO) ACYLPHENYLMERCAPTO] ALKANOIC ACIDS AND DERIVATIVES THEREOF
James M. Sprague, Gwynedd Valley, and Everett M. Schultz, Ambler, Pa., assignors to Merck & Co., Inc., Rahway, N.J., a corporation of New Jersey
No Drawing. Continuation of application Ser. No. 381,246, July 8, 1964. This application Apr. 27, 1966, Ser. No. 545,773
Int. Cl. C07c *147/00;* A61k *27/00*
U.S. Cl. 260—455
13 Claims This application is a continuation of U.S. application Ser. No. 381,246, filed July 8, 1964, which is a continuation-in-part of U.S. application Ser. No. 238,714, filed Nov. 19, 1962, which is a continuation-in-part of U.S. application Ser. No. 155,961, filed Dec. 6, 1961, and U.S. application Ser. No. 83,635, filed Jan. 19, 1961. Application Ser. No. 155,961 has since issued as U.S. Patent No. 3,255,241 on June 7, 1966.

This invention relates to [β-(substituted-thio)-acylphenoxy]alkanoic acids and [β-(substituted-thio)-acylphenylmercapto]alkanoic acids and their corresponding salts, esters and amides of the type illustrated by the following structural formula:

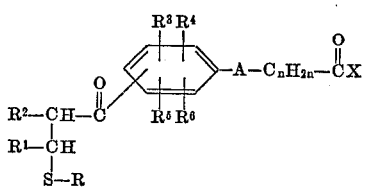

wherein:

A is a member selected from the group consisting of oxygen, and sulfur which may be in an oxidized form as, for example, in the form of the sulfoxide (i.e., —SO—) or sulfone (i.e., —$SO_2$—) group;
R is a member selected from the group consisting of

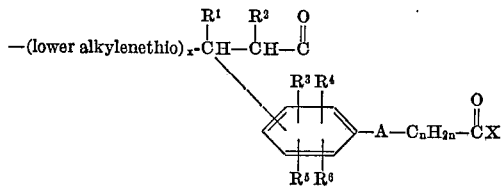

wherein:

A is as defined above,
$x$ is zero or one and
$R^1$, $R^2$, $R^3$, $R^4$, $R^5$, $R^6$, and
X have the meaning hereinafter described, alkyl, especially lower alkyl, either unsubstituted or containing one or more substituents selected from the group consisting of hydroxyl, thio, carboxyl or an ester or amide thereof, e.g., alkoxycarbonyl, carboxamido, etc., thiocarbamoyl, amino, substituted amino, especially an acyl amino, e.g., derived from an aliphatic carboxylic acid or a benzoic or substituted benzoic acid, phenyl or substituted phenyl, e.g., containing one or more carboxyl groups, lower alkenyl, cycloalkyl, e.g., cyclopropyl, cyclobutyl, cyclopentyl, cyclohexyl and the like, mononuclear aryl, advantageously phenyl either unsubstituted or containing one or more substituents selected from the group consisting of carboxyl or esters or amides thereof, e.g., alkoxycarbonyl, carboxamido, etc., halogen, i.e., chlorine, bromine, iodine and fluorine, trichloromethyl and trifluoromethyl, lower alkyl, lower alkoxyl, lower alkanoyl and thioalkanoyl, and benzoyl wherein the phenyl moiety can be either unsubstituted or substituted as described above for the mononuclear aryl substituent;

$R^1$ is selected from the group consisting of hydrogen, lower aliphatic straight or branched chain, and unsubstituted or substituted, the substituent group(s) being alkyl carboxyl or substituted carboxyl, e.g., alkoxycarbonyl, carboxamido, etc., aryl or substituted aryl, especially a mononuclear aryl, e.g., phenyl, halophenyl, lower alkylphenyl and lower alkoxyphenyl, and aryl, especially phenyl wherein the aryl(phenyl) moiety can be unsubstituted or a substituent can be attached, e.g., a lower alkyl, halogen, or lower alkoxy substituent;

$R^2$ is selected from the group consisting of hydrogen, halogen, hydroxyl, lower aliphatic, lower aliphatic-oxy or lower aliphatic-thio, straight or branched chain, saturated or unsaturated and unsubstituted or substituted, the substituent group(s) being alkyl, amino, particularly a substituted amino, carboxyl or substituted carboxyl, e.g., alkoxycarbonyl, carboxamido, etc., alkylthio, aryl or substituted aryl, especially a mononuclear aryl, e.g., phenyl, halophenyl, lower alkylphenyl, and lower alkoxyphenyl, arylthio, heterocyclic, especially piperidino, 1-pyrrolidinyl, morpholino and the like, alicyclic, either unsubstituted or substituted, the substituent group being, e.g., a lower alkyl group, and aryl or aryloxy, especially a phenyl or phenoxy wherein the aryl(phenyl) moiety can be unsubstituted or a substituent can be attached, e.g., a lower alkyl, halogen or lower alkoxy substituents;

$R^3$, $R^4$, $R^5$ and $R^6$, respectively, represent similar or dissimilar radicals selected from the group consisting of hydrogen, halogen, lower aliphatic straight or branched chain, lower aliphatic-oxy straight or branched chain such as a lower alkoxy, either unsubstituted or substituted such as carboxyalkoxy and the like, hydroxyl attached to one of the positions 2 or 6, nitro, and acylamino, or wherein $R^3$ and $R^4$ and/or $R^5$ and $R^6$ can additionally be linked together to form, with the ring carbons to which they are attached, a 5- or 6-membered carbocyclic ring;

X is a member selected from the group consisting of hydroxyl or salts of the resulting acids, i.e., metal salts, especially sodium, potassium, calcium and the like or amine salts, alkoxyl unsubstituted or substituted, the substituent(s) being dialiphatic amino and the like, e.g., dialkylamino, etc., hydrazino, preferably substituted such as

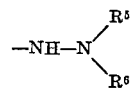

wherein $R^5$ and $R^6$ each represent similar or dissimilar radicals selected from the group consisting of hydrogen and lower alkyl and, advantageously, a 2,2-di-lower-alkyl hydrazino group, and amino, such as an amino group of the structure —$NR^7R^8$ wherein $R^7$ and $R^8$ are the same or different and represent a member selected from the group consisting of hydrogen atoms or aliphatic groups, e.g., alkyl, unsubstituted or substituted, or aromatic groups, unsubstituted or substituted, especially substituted phenyl, or $R^7$ and $R^8$ can be joined together to form, with the nitrogen atom to which they are attached, a cyclic radical containing one or more hetero atoms such as morpholino, piperidino, 1-pyrrolidinyl and the like, and —$C_nH_{2n}$— represents a straight or branched chain lower alkylene linkage as, for example, a lower alkylene chain of one to five carbon atoms such as methylene (i.e., —$CH_2$—), ethylene (i.e., —$CH_2$—$CH_2$—), etc.

In the above definitions and in the claims, the term halogen embraces chlorine, bromine, iodine and fluorine.

The compounds of this invention possess diuretic, natriuretic and chloruretic properties and are therefore useful in the treatment of many ailments resulting from an excessive retention of electrolytes, such as in edema and the like.

Compounds of this invention which have been found to possess especially good natriuretic properties have the structure:

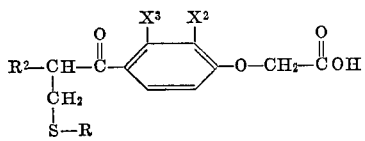

wherein:

R is a member selected from the group consisting of:
(1) a lower alkyl radical as, for example, methyl, isopropyl, etc.,
(2) an amino-carboxy-lower alkyl radical as, for example, 2-amino-2-carboxyethyl, 3-amino-3-carboxypropyl, etc.,
(3) a phenyl-lower alkyl radical as, for example, benzyl, etc.,
(4) a 2-(gamma-L-glutamylamino)-2-(N-carboxymethylcarbamoyl)lower alkyl radical, for example, 2-(gamma-L-glutamylamino) - 2 - (N-carboxymethylcarbamoyl)ethyl, etc.,
(5) a thio-hydroxy-lower alkyl radical as, for example, 2-thio-3-hydroxypropyl, etc.;

$R^2$ is low alkyl, for example, methyl, ethyl, propyl, isopropyl, etc.;

$X^2$ is a member selected from the group consisting of hydrogen, halogen, e.g., chlorine, etc. and lower alkyl, e.g., methyl, etc. and $X^3$ is a member selected from the group consisting of halogen, e.g., chlorine, etc. and lower alkyl, e.g., methyl, etc.

It will be appreciated that the dosage of the novel compounds of this invention will vary over a wide range depending upon the age and weight of the patient to be treated, upon the particular ailment to be treated, and the relative potency of the selected diuretic agent. For these reasons, tablets, pills, capsules, and the like containing, for example, from about 25 to about 500 mg. or more of active ingredient can be made available for the symptomatic adjustment of the dosage to the individual patent. These dosages appear to be well below the toxic dose of the novel compounds of this invention.

The compounds of this invention are prepared by the reaction illustrated below:

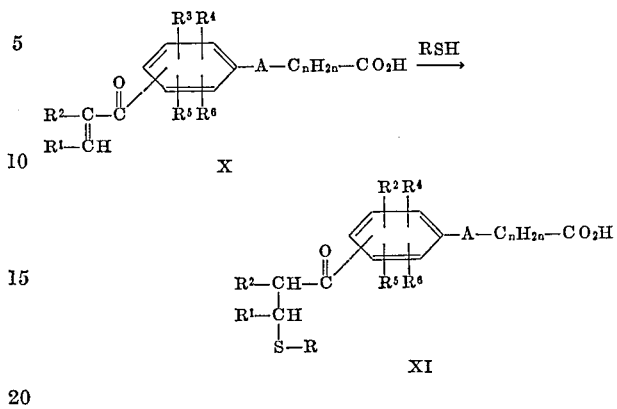

wherein the radicals A, R, $R^1$, $R^2$, $R^3$, $R^4$, $R^5$, $R^6$ and $n$ are as defined above. According to the above reaction scheme, the mercaptan R—SH, is reacted with the ($\alpha$-alkylideneacyl)phenoxy or ($\alpha$-alkylideneacryl(phenylmercapto derivative of a carboxylic acid. The reaction advantageously is carried out with slight warming, which need be only enough to melt the reactants. Upon cooling, the product is obtained, generally in the form of a solid. In the event the mercaptan, R—SH, is volatile, an excess is used to insure the presence of sufficient mercaptan at the reaction site to provide a substantial yield of product. Heating of the reaction mixture is not necessary when the mercaptan and $\alpha$-alkylideneacyl compound react readily. In general, the reaction can be carried out either with or without a solvent and either with or without heat.

Alternatively, when each reactant is soluble in sodium bicarbonate solution, each can be dissolved in a separate aqueous sodium bicarbonate solution, the solutions combined and allowed to stand, advantageously at room temperature, until the reaction is substantially complete.

When the mercaptan, R—SH, is not soluble in sodium bicarbonate solution it is added to the sodium bicarbonate solution of the $\alpha$-alkylideneacyl compound and the reaction mixture stirred or shaken until the soluble product is formed and all or substantially all of the insoluble mercaptan disappears.

When the reaction product contains a basic group, such as an amino group, it is isolated by acidifying the reaction mixture, evaporating to dryness and separating the product from inorganic salts by extraction with an organic solvent. When the product has only acidic groups, it separates upon acidifying the reaction mixture.

The mercaptan starting materials are known and either can be obtained commercially or they can be made by methods described in the literature.

The $\alpha$-methyleneacylphenoxy- and $\alpha$-methyleneacylphenylmercapto-derivatives of organic carboxylic acids, and especially the organic monocarboxylic acids (which are employed as reactants in the foregoing reaction) can be prepared by several methods, as illustrated below for the preparation of the ($\alpha$-methyleneacylphenoxy)acetic acid reactants:

PREPARATION OF AN $\alpha$-ALKYLIDENEACYLPHENOXY-ACETIC ACID (X)

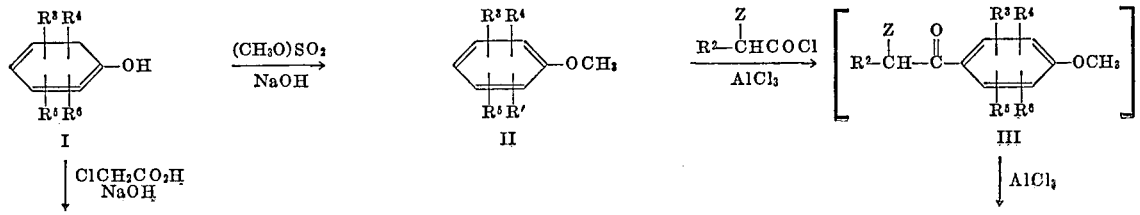

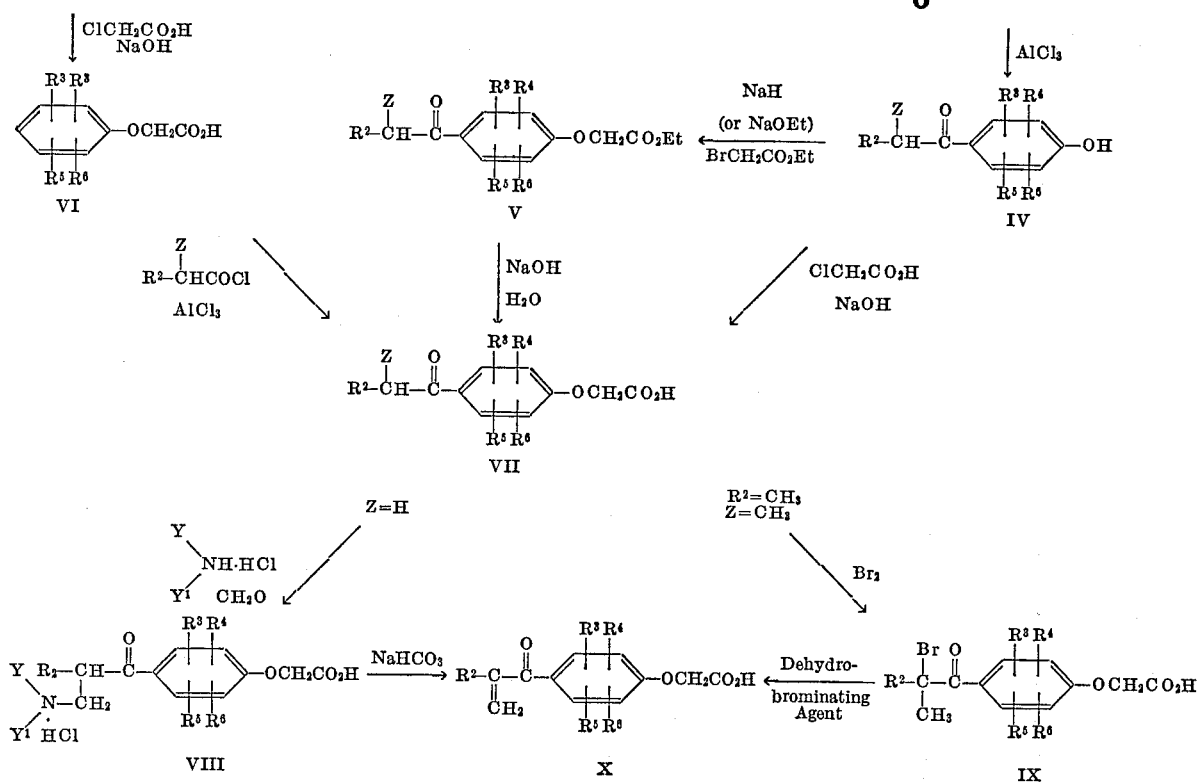

The above reaction scheme shows that the (α-alkylideneacylphenoxy)alkanoic acid compounds (X) of the invention can be prepared from the (saturated-acylphenoxy)alkanoic acid compounds (VII) by two methods, the selection depending principally upon whether Z represents H or whether Z represents —$CH_3$, or —$CH_2$-Alkyl or —CH(Alkyl)$_2$.

When Z is H the saturated acylphenoxyalkanoic acids (VII) are converted to the (α-methyleneacylphenoxy) alkanoic acids (X) by first preparing the Mannich derivative (VIII) which, upon treatment with sodium bicarbonate, is converted to the desired compound (X).

The Mannich derivative advantageously is prepared by reacting the saturated acyl compound (VII) with a salt of a secondary amine, i.e. YY′NH·HCl such as a di-lower alkylamine or a salt of a cyclic amine such as piperidine, morpholine and the like, in the presence of formaldehyde or paraformaldehyde. Treatment of the Mannich salt with a base such as aqueous sodium carbonate or, preferably, sodium bicarbonate, either with or without heat, gives the desired unsaturated acyl compound (X).

Dehydrohalogenation of the unsymmetrically branched chain (α-bromoacylphenoxy)alkanoic acid reactants of the invention (i.e., those reactants in which the alpha carbon of the acyl group bears two dissimilar alkyl substituents) generally proceeds according to one of two possible routes. If one of the two alkyl substituents is methyl and the remaining substituent is an ethyl group or some higher homologous derivative thereof, unsaturation will generally occur in the alkyl group containing the longer chain, i.e., in the ethyl radical or in its higher homologous group. However, if one of the two alkyl substituents is an ethyl radical and the remaining alkyl group is an higher homologous substituent, for example, propyl, butyl, etc., dehydrohalogenation generally results in a mixture of products. A portion of the reaction mixture will contain the ethylidene variety of (α-alkylideneacyl)alkanoic acid product and the remainder will be the α-propylidene derivative or other alkylidene variety of product corresponding to the higher alkyl precursor employed as the starting material. The isomers thus formed can usually be separated by conventional means. On the other hand, if the alpha carbon of the acyl group is symmetrically substituted by methyl, ethyl or some other higher homologus alkyl group, dehydrohalogenation will obviously result in the formation of only one type of unsaturated product.

Thus, when Z is —$CH_3$ or particularly when Z is —$CH_2$-Alkyl, the (saturated-acylphenoxy)alkanoic acid (VII) is converted to the unsaturated compound X by halogenating compound VII and then treating the halogenated compound IX with a dehydrohalogenating agent. This procedure is especially useful when the $R^2$ and Z groups in the saturated acylphenoxy or saturated acylphenylmercapto derivative (VII) are both methyl. The saturated acyl compound (VII) advantageously is brominated to form Compound IX which then is converted to compound X by treatment with a dehydrohalogenating agent such as, advantageously, lithium bromide or lithium chloride in dimethylformamide, or silver acetate or silver fluoride in benzene and the like. If, in the above starting material VII, $R^2$ is —$CH_3$ and Z is ethyl or a higher alkyl group, the predominate product (illustrated below as X–A will have the double bond located in the longer chain. The isomeric compound (illustrated below as X–B) is generally the minor product:

Similarly, when, in the above starting material (VII), $R^2$ and Z are not identical and represent an ethyl or an higher alkyl group, the product will be a mixture of isomers which may be separated by various methods, e.g., fractional crystallization, chromatography, etc.

Compounds having an unsaturated acyl group of the type:

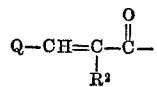

wherein Q is an unsubstituted or substituted aryl (i.e. phenyl) group and $R^2$ is hydrogen or a group of the type hereinabove included in the definition of $R^2$, preferably are prepared by condensing an arylaldehyde, e.g., benzaldehyde, in an alkaline medium with Compound VII (where Z is H), followed by acidification of the reaction mixture.

Preparation of (saturated-acylphenoxy)alkanoic acids (VII)

The intermediate (saturated-acylphenoxy)alkanoic acid (VII) generally can be made by one of two methods from the known phenol (I).

The first method involves heating the phenol (I) with an excess of a chloro-alkanoic acid, e.g., chloroacetic acid, in the presence of at least two moles of an alkali metal hydroxide to form the corresponding phenoxyalkanoic acid (VI), e.g., phenoxyacetic acid.

The phenoxyalkanoic acid (VI) is then converted to the corresponding saturated (acylphenoxy)alkanoic acid (VII) by the Friedel-Craft reaction of an acyl halide,

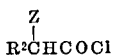

and Compound VI in the presence of anhydrous aluminum chloride. The reaction can be carried out either with or without a solvent as, for example, carbon disulfide. Although this method has limited applicability it is usually the one of choice, where applicable, since it is the most direct route.

The second method, although longer, has a broader utility. In this process, the phenol (I) is converted to the corresponding anisole (II) (or phenetole) by known methods, as by reaction with dimethyl sulfate or diethyl sulfate in the presence of a base such as sodium or potassium hydroxide. The anisole (II) (or phenetole) then is reacted with the acyl halide.

in the presence of anhydrous aluminum chloride and a solvent, such as ligroin or carbon disulfide. The acylanisole (III) (or phenetole) then is converted to the corresponding acylphenol (IV) by subsequent treatment with additional aluminum chloride in a solvent such as heptane.

The acylphenol (IV) is then converted to the (saturated-acylphenoxy)alkanoic acid (VII) by reaction with an haloaliphatic acid (preferably chloroacetic acid) in the presence of sodium or potassium hydroxide.

Alternatively, compound VII can be prepared from compound IV by a two step process whereby the acylphenol (IV) is treated with a suspension of sodium hydride in ethylene dimethyl ether (glyme) (or sodium ethoxide in ethanol) followed by reaction with an halo-aliphatic acid ester, such as ethyl bromoacetate, to form the corresponding (acylphenoxy)alkanoic acid ester (V). Hydrolysis of the ester (V) by aqueous or alcoholic base produces Compound VII.

While, for simplicity sake, the reaction scheme illustrating the preparation of the (α-alkylideneacylphenoxy) alkanoic acids shows the preparation of (para-acylphenoxy)acetic acid compounds, the methods illustrated and described above can be employed to make the other position isomers as well. It sometimes is more convenient, however, to prepare the ortho isomers by the Fries Rearrangement illustrated below. The R substituents in the following structures are attached to the phenyl nucleus so as to leave one of the ortho positions unsubstituted.

Preparation of o-(α-alkylideneacyl) phenoxyacetic acids (VII)

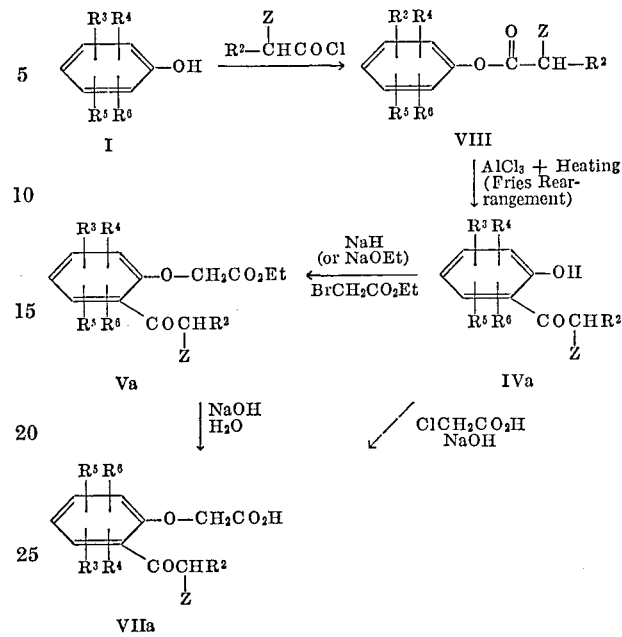

According to the Fries Rearrangement procedure, illustrated above, the phenol (I) is initially esterified by reaction with the acyl halide,

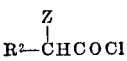

to form the corresponding phenolic ester (VIII), which ester is then rearranged to the ortho-acylphenol (IVa) by heating with aluminum chloride. The conversion of the ortho-acylphenol (IVa) to the desired (ortho-acylphenoxy)acetic acid (VIIa) by:

(a) treatment with chloroacetic acid in presence of base or
(b) reaction of IVa with sodium hydride or sodium alkoxide followed by reaction with an haloacetic acid ester to form Va, which is hydrolized to VIIa, following substantially the same procedures described above for converting IV to VII or for converting IV to V to VII. While the Fries Rearrangement is especially useful for preparing the ortho-isomers, it may also be used to prepare the para-isomers by suitably modifying the reaction conditions.

The above-described procedure for preparing the (α-alkylideneacylphenoxy)aliphatic acids generally can be adapted to prepare the (α-alkylideneacylphenylmercapto) aliphatic acids as well.

While the above discussion outlines general methods suitable for the preparation of the novel compounds of this invention, it is to be understood that the methods described above as well as those described in the following examples are illustrative of those methods which can be employed and are not to be construed as limiting the invention to the particular mehods or the particular compounds specifically described.

The words "Mannich compound" used in the following examples refer to the salts of the Mannich bases prepared by a procedural step described in any one particular example. Also, in the examples, all melting points are corrected and the boiling points are uncorrected values. The melting points of some of the compounds are difficult to define as they decompose over a wide range.

The following Procedures illustrate the preparation of the [(α-akylideneacyl)phenoxy]alkanoic acid starting materials used in the preparation of the novel compounds of this invention.

PROCEDURE I

Preparation of [3-chloro-4-(2-methylenebutyryl)phenoxy]acetic acid

Step A: Preparation of (3-chloro-4-butyrylphenoxy)acetic acid.—Powdered aluminum chloride (217 g., 1.625 mole) and carbon disulfide (400 ml.) are placed in a 1-liter, 4-necked flask equipped with a stirrer, dropping funnel, reflux condenser and internal thermometer. (3-chlorophenoxy)acetic acid (93.3 g., 0.5 mole) is added in portions with stirring and then n-butyryl chloride (66.6 g., 0.625 mole) is added dropwise with stirring over a period of 0.5 hour at a temperature of about 22–26° C. After stirring 1 hour at room temperature, the reaction flask is placed in a water bath and the temperature maintained at 50° C. for 3 hours. The carbon disulfide then is decanted and the gummy reaction product obtained is added to a mixture of ice (1 kg.) and concentrated hydrochloric acid (100 ml.). A solid separates and is dissolved in saturated sodium bicarbonate solution (1.5 liters). The solution is filtered, and the clear, yellow filtrate obtained is acidified with hydrochloric acid. The yellow oil that separates solidifies slowly to give a solid melting at 76–85° C. After recrystallization from benzene, there is obtained 66.7 g., 51%, of (3-chloro-4-butyrylphenoxy)acetic acid, M.P. 89–90° C.

Analysis.—Calculated for $C_{12}H_{13}ClO_4$: C, 56.15; H, 5.10; Cl, 13.18. Found: C, 56.24; H, 5.43; Cl 13.57.

Step B: Preparation of [3-chloro-4-[2-(dimethylaminomethyl)butyryl]phenoxy]acetic acid hydrochloride.—In a 100 ml. round flask equipped with an outlet tube suitable for application of intermittent suction, an intimate mixture of (3-chloro-4-butyrylphenoxy)acetic acid (5.12 g., 0.02 mole), paraformaldehyde (0.7 g., 0.022 mole), dry dimethylamine hydrochloride (1.78 g., 0.02 mole) and acetic acid (4 drops) is heated on the steam bath for about 1.5 hours during which period suction is applied for about 1 minute intervals 5 or 6 times. Upon cooling, a solid is obtained which after triturating with acetone gives the product in the form of a white solid. Upon recrystallization from acetonitrile, and from isopropyl alcohol, there is obtained [3-chloro-4-[2-(dimethylaminomethyl)butyryl]phenoxy]acetic acid hydrochloride, M.P. 127–129° C.

Analysis.—Calculated for: $C_{15}H_{20}ClNO_4 \cdot HCl$: C, 51.44; H, 6.04; Cl, 20.25. Found: C, 51.32; H, 5.90; Cl, 20.19.

Step C: Preparation of [3-chloro-4-(2-methylenebutyryl)phenoxy]acetic acid.—The Mannich compound obtained as described in Step B is dissolved in 25 ml. of water and the solution made slightly basic by the addition of 10% sodium bicarbonate solution. The resulting solution is heated for about 25 minutes on a steam bath, cooled and acidified with 6 N hydrochloric acid to give a 69% yield of crude product, M.P. 108–109.5° C. After recrystallization from a mixture of cyclohexane and benzene there is obtained [3-chloro-4-(2-methylenebutyryl)phenoxy]acetic acid, in the form of colorless crystals, M.P. 109–111° C.

Analysis.—Calculated for: $C_{13}H_{13}ClO_4$: C, 58.11; H, 4.88; Cl, 13.20. Found: C, 57.87; H, 5.05; Cl, 13.02.

PROCEDURE II

Preparation of (3-chloro-4-methacryloylphenoxy)acetic acid

Step A: Preparation of (3-chlorophenoxy)acetic acid.—m-Chlorophenol (64.27 g., 0.5 mole) is aded to a solution of sodium hydroxide (75 g., 1.875 mole) in 150 ml. of water. To this is added slowly at 40° C. a solution of chloroacetic acid (80.5 g., 0.852 mole) in 80.5 ml. of water. When the addition is complete, the mixture is heated with stirring on a steam bath for 1 hour after which the reaction mixture is cooled and 1 liter of water is added. The solution is filtered and acidified to Congo red with concentrated hydrochloric acid and the pink oil that separates is extracted with ether. The ether solution then is extracted with a total of 400 ml. of a 10% sodium bicarbonate solution in several portions to remove the product from unreacted phenol. Acidification of the sodium bicarbonate extract yields an oil that soon solidifies. The solid is collected and dried in an oven at 65° C. to give 67.8 g. (73%) of (3-chlorophenoxy)acetic acid, M.P. 110–111° C. (Coor.).

Step B: Preparation of (3-chloro-4-isobutyrylphenoxy)acetic acid.—The above product is prepared following substantially the same procedure described in Procedure I, Step A, using the following substances:

| | |
|---|---:|
| (3-chlorophenoxy)acetic acid (0.20 mole) ____g__ | 37.3 |
| Isobutyryl chloride (0.25 mole) _____g__ | 26.6 |
| Aluminum chloride, powdered (0.63 mole) ____g__ | 83.9 |
| Carbon disulfide _____ml__ | 200 |

A 17.3% yield (8.93 g.) of (3-chloro-4-isobutyrylphenoxy)acetic acid is obtained, M.P. 137–139° C.

Analysis.—Calculated for: $C_{12}H_{13}ClO_4$: C, 56.15; H, 5.10; Cl, 13.82. Found: C, 56.04; H, 5:34; Cl, 14.05.

Step C: Preparation of [3-chloro-4-(2-bromoisobutyryl)phenoxy]acetic acid.—(3-chloro-4-isobutyrylphenoxy)acetic acid (10.17 g., 0.0397 mole) is added to 250 ml. glacial acetic acid at room temperature. Bromine (6.34 g., 0.0397 mole) in 30 ml. of glacial acetic acid is added dropwise to the reaction mixture at about 25° C., with stirring, during a period of 1 hour. Stirring is continued an additional hour and the mixture then is added to a mixture of 300 g. of ice and 500 ml. of water. The crude product obtained is crystallized from a mixture of hexane and benzene. Upon cooling the mixture at 5° C. for one hour the product precipitates and is collected, and dried at 65° C. to give 8.39 g. (63%) of [3-chloro-4-(2-bromoisobutyryl)phenoxy]acetic acid, M.P. 124.5–125° C. (Corr.).

Analysis.—Calculated for: $C_{12}H_{12}BrClO_4$: C, 42.94; H, 3.61; Br, 23.81. Found: C, 43.33; H, 3.78; Br, 23.22.

Step D: Preparation of (3-chloro-4-methacryloylphenoxy)acetic acid.—The brominated compound obtained as described in Step C (5 g., 0.0149 mole) is dissolved in benzene (200 ml.) and silver acetate (5 g., 0.0299 mole) is added. The mixture is stirred and refluxed for 4 hours and then cooled. Water (150 ml.) and concentrated hydrochloric acid (15 ml.) is added whereupon the silver salts precipitate and are removed by filtration. The benzene then is evaporated to a small volume, diluted with hexane and the solid that separates is collected on a filter to give 2.8 g., M.P. 125–127° C. After 4 recrystallizations from benzene there is obtained 1.05 g. of (3-chloro-4-methacryloylphenoxy)acetic acid, M.P. 128–129° C. (Corr.).

Analysis.—Calculated for $C_{12}H_{11}ClO_4$: C, 56.54; H, 4.35; Cl, 13.93. Found: C, 56.31; H, 4.45; Cl, 14.10.

PROCEDURE III

Preparation of [2,3-dichloro-4-(2-methylenebutyryl)phenoxy]acetic acid

Step A: Preparation of (2,3-dichloro-4-butyrylphenoxy)acetic acid.—The above product is prepared employing substantially the same technique and apparatus described in Procedure I, Step A, using the following products:

| | G. |
|---|---:|
| (2,3-dichlorophenoxy)acetic acid (0.1 mole) _____ | 22.1 |
| n-Butyryl chloride (0.2 mole) _____ | 21.3 |
| Powdered aluminum chloride (0.4 mole) _____ | 53.3 |

The (2,3-dichlorophenoxy)acetic acid and n-butyryl chloride are placed in the reaction vessel and stirred while the aluminum chloride is added portionwise over a 45 minute period. The mixture then is heated on a steam bath for 3 hours, and allowed to cool to room temperature. The gummy product obtained is added to a mixture of 300 g. of crushed ice and 30 ml. concentrated hydrochloric acid. The resulting mixture is extracted with ether and the extract evaporated at reduced pressure. The residue is suspended in boiling water and dissolved by addition of a minimum quantity of 40% sodium hydroxide. After treatment with decolorizing charcoal and filtering, the hot filtrate is made acid to Congo red paper and chilled in ice. The oil that separates is extracted with ether, the extract dried over anhydrous sodium sulfate and then evaporated at reduced pressure. The residue is dissolved in boiling benzene (75 ml.) treated with decolorizing charcoal, filtered, treated with boiling cyclohexane (275 ml.) and cooled to give 22.3 g. of (2,3-dichloro-4-butyrylphenoxy)acetic acid. After several recrystallizations from a mixture of benzene and cyclohexane, then from methylcyclohexane, next from a mixture of acetic acid and water and finally from methylcyclohexane, the product melts at 110–111° C. (Corr.).

*Analysis.*—Calculated for $C_{12}H_{12}Cl_2O_4$: C, 49.51; H, 4.15; Cl, 24.36. Found: C, 49.81; H, 4.22; Cl, 24.40.

Step B: Preparation of [2,3-dichloro-4-[2-(dimethylamino-methyl)butyryl]phenoxy]acetic acid hydrochloride.—The above product is prepared following substantially the same procedure described in Procedure I, Step B, using the following substances:

(2,3-dichloro-4-butyrylphenoxy)-acetic acid (0.0179 mole) _____g__ 5.20
Paraformaldehyde (0.0209 mole) _____g__ 0.63
Dimethylamine hydrochloride (dry) (0.0195 mole) g__ 1.59
Acetic acid _____drops__ 4

The crude reaction product is triturated with ether to give 5.8 g. (85% of [2,3-dichloro-4-[2-dimethylaminomethyl)butyryl]phenoxy]acetic acid hydrochloride in the form of a white solid. After two recrystallizations from a mixture of methanol and ether, the product melts at 165–167° C.

*Analysis.*—Calculated for: $C_{15}H_{20}Cl_3NO_4$: C, 46.83; H, 5.24; Cl, 27.65; N, 3.64. Found: C, 46.69; H, 5.31; Cl, 27.59; N, 3.53.

Step C: Preparation of [2,3-dichloro-4-(2-methylenebutyryl)phenoxy]acetic acid.—The Mannich compound obtained as described above is treated with aqueous sodium bicarbonate by substantially the same method described in Procedure I, Step C, to give [2,3-dichloro-4-(2-methylenebutyryl)phenoxy]acetic acid, M.P. 115–118° C. Two recrystallizations from a mixture of benzene and cyclohexane give white solid material melting at 118.5–120.5° C.

*Analysis.*—Calculated for: $C_{13}H_{12}Cl_2O_4$: C, 51.51; H, 3.99; Cl, 23.39. Found: C, 51.23; H, 4.18; Cl, 23.49.

PROCEDURE IV

Preparation of [2,3-dimethyl-4-(2-methylenebutyryl)phenoxy]acetic acid

Step A: Preparation of (2,3-dimethyl-4-butyrylphenoxy)acetic acid.—This product is prepared following substantially the same procedure described in Procedure I, Step A, using the following substances:

(2,3-dimethylphenoxy)acetic acid _____g__ 90
n-Butyryl chloride _____g__ 66.6
Carbon disulfide _____ml__ 400
Powdered aluminum chloride _____g__ 217

The above procedure yields 83.7 g. (67%) of crude product which after recrystallization from a mixture of benzene and cyclohexane gives (2,3-dimethyl-4-butyrylphenoxy)acetic acid, M.P. 87–88° C.

*Analysis.*—Calculated for: $C_{14}H_{13}O_4$: C, 67.18; H, 7.25. Found: C, 67.74; H, 7.27.

Step B: Preparation of [2,3-dimethyl-4-[2-(dimethylamino-methyl)butyryl]phenoxy]acetic acid hydrochloride.—This Mannich compound is prepared following substantially the same procedure described in Procedure I, Step B, using the following substances:

(2,3-dimethyl-4-butyrylphenoxy)-acetic acid _____g__ 10
Paraformaldehyde _____g__ 1.4
Dimethylamine hydrochloride _____g__ 3.56
Glacial acetic acid _____ml__ 0.5

The viscous homogeneous mixture obtained as a result of the above procedure is dissolved in 90 ml. of ethyl alcohol, filtered and precipitated with 150 ml. of ether. The product is recrystallized from a mixture of ethyl alcohol and ether, filtered and dried in vacuo over phosphorus pentoxide to give 11.8 g. (90%) of [2,3-dimethyl-4-[2-(dimethylaminomethyl)butyryl]phenoxy] acetic acid hydrochloride, M.P. 178.5–180° C. (Corr.).

*Analysis.*—Calculated: for $C_{17}H_{26}ClNO_4$: C, 59.38; H, 7.62; N, 4.07. Found: C, 59.52; H, 7.35; N, 3.87.

Step C. Preparation of [2,3-dimethyl-4-(2-methylenebutyryl)phenoxy]acetic acid.— This product is prepared by substantially the same procedure described in Procedure I, Step C, using 28.1 g. of the Mannich compound obtained in Step B. The crude product is recrystallized several times from 250 ml. of methylcyclohexane to give 7.0 g., (33%) of [2,3-dimethyl-4-(2-methylenebutyryl)-phenoxy]acetic acid, M.P. 83.5–84.5° C. (Corr.).

*Analysis.*—Calculated: for $C_{15}H_{18}O_4$: C, 68.68; H, 6.92. Found: C, 68.46; H, 7.24.

PROCEDURE V

[2,3-dichloro-4-(2-ethylidenebutyryl)phenoxy] acetic acid

Step A: Preparation of 2-ethyl-2′,3′-dichloro-4′-hydroxybutyrophenone.—A mixture of 2,3-dichloroanisole (53.11 g., 0.3 mole), carbon disulfide (350 ml.) and 2-ethylbutyryl chloride (80.77 g., 0.6 mole) is treated, under anhydrous conditions, with aluminum chloride powder (40 g., 0.3 mole), over a period of 5 minutes with stirring. The mixture is stirred for 6 hours at room temperature overnight. The reaction mixture is heated with stirring in a 55° C. water bath until the evolution of hydrogen chloride ceases (1½ hour), cooled to room temperature and treated, under anhydrous conditions, with aluminum chloride powder (40 g., 0.3 mole), over a period of 5 minutes with stirring. The mixture is then heated in a 55° C. water bath with stirring for 1½ hours. The carbon disulfide is removed under reduced pressure and an equal volume of dry heptane is added to the residue. The resulting mixture then is heated on a steam bath with stirring for three hours. After cooling to room temperature, the heptane is decanted and the residue is added to a mixture of ice (450 g.) and concentrated hydrochloric acid (45 ml.). The resulting oil is extracted with ether, dried over anhydrous sodium sulfate and the ether then removed under reduced pressure. The remaining material is treated with excess 5% aqueous sodium hydroxide solution and heated under reflux for one hour, then cooled and extracted with ether to remove insoluble oil. The clear aqueous solution is acidified with concentrated hydrochloric acid and the resulting oil is extracted with ether, the ethereal solution dried over anhydrous sodium sulfate and the ether again removed under reduced pressure. Distillation of the residual oil gives 34.45 g. (44%) of the product in the form of a liquid, B.P. 140–142° C. at 0.5 mm. pressure. After 3 recrystallizations from hexane, 2-ethyl-2′,3′-dichloro-4′-hydroxybutyrophenone is obtained in the form of white needles, M.P. 85–86° C.

*Analysis.*—Calculated for $C_{12}H_{14}Cl_2O_2$: C, 55.19; H, 5.40; Cl, 27.15. Found: C, 55.21; H, 5.64; Cl, 26.98.

Step B: Preparation of [2,3-dichloro-4-(2-ethylbutyryl) phenoxy]acetic acid.—A solution of sodium (2.53 g., 0.11 mole) in absolute ethanol (300 ml.) is treated first with 2-ethyl-2′,3′ - dichloro-4′ - hydroxybutyrophenone (26.12 g., 0.1 mole) and then with ethyl bromoacetate (20.04 g., 0.12 mole) and the resulting clear solution is heated under reflux, with stirring, for 2 hours. Then aqueous 5% potassium hydroxide (11.22 g., 0.2 mole) is added and refluxing with stirring is continued for 1 hour longer. The alcohol is removed by distillation at atmospheric pressure and the boiling aqueous residue is made acid to Congo red test paper by the addition of concentrated hydrochloric acid. An oil separates which solidifies after cooling to room temperature. It is extracted with ether, the ethereal extract dried over anhydrous sodium sulfate, and the ether then is removed under reduced pressure to give 31.9 g. (100%) of [2,3-dichloro-4-(2-ethylbutyryl)phenoxy]acetic acid in the form of a white solid, M.P. 128–139° C. One recrystallization from a mixture of benzene and cyclohexane gives 28.7 g. (90%) of the product in the form of needles, melting at 144.5–145.5° C.

*Analysis.*—Calculated for $C_{14}H_{16}Cl_2O_4$: C, 52.68; H, 5.05; Cl, 22.22. Found: C, 52.75; H, 5.00; Cl. 22.08.

Step C: Preparation of [2,3-dichloro-4-(2-bromo-2-ethylbutyryl)phenoxy]acetic acid.—This product is prepared by substantially the same method described in Procedure II, Step C, using the following reagents:

[2,3-dichloro-4 - (2 - ethylbutyryl)phenoxy]acetic
  acid (0.0603 mole) _____g__ 19.26
Bromine (0.0603 mole) _____g__  9.64
Glacial acetic acid _____ml__  530

The above process gives 23.71 g. (99%) of [2,3-dichloro-4-(2-bromo-2-ethylbutyryl)phenoxy]acetic acid in the form of a white solid, M.P. 151.5–152.5° C.

One recrystallization from benzene gives the product in the form of white needles, M.P. 151.5–152.5° C.

*Analysis.*—Calculated for $C_{14}H_{15}BrCl_2O_4$: C, 42.24; H, 3.80; Cl, 17.81. Found: C, 42.53; H, 4.00; Cl, 17.73.

Step D: Preparation of [2,3-dichloro-4-(2-ethylidenebutyryl)phenoxy]acetic acid.—The bromoketone prepared as described in Step C (19.91 g., 0.05 mole) is dissolved in dimethylformamide (140 ml.) and anhydrous lithium chloride (6.36 g., 0.15 mole) is added. The mixture is heated on the steam bath with occasional shaking for two hours, cooled and poured into 1 liter of cold water. The solid that separates is collected by filtration, washed with 500 ml. of water and then dissolved in dilute sodium bicarbonate solution. The solution is shaken with Norite, filtered free of solid and acidified. The solid that separates is recrystallized from a mixture of benzene and cyclohexane to give 14.52 g. (92%) of [2,3-dichloro-4-(2-ethylidenebutyryl)phenoxy]acetic acid in the form of white needles, M.P. 124–125.5° C. A second recrystallization from the same solvent mixture does not change the melting point.

*Analysis.*—Calculated for $C_{14}H_{14}Cl_2O_4$: C, 53.02; H, 4.45; Cl, 22.36. Found: C, 53.28; H, 4.43; Cl, 22.34.

The following examples describe the preparation of the novel compounds of this invention.

Example 1 illustrates the reaction of a mercaptan and an (α-methyleneacylphenoxy)acetic acid in absence of solvent.

EXAMPLE 1

[3-chloro-4-[2-(isopropylthiomethyl)butyryl]phenoxy] acetic acid

[3-chloro-4-(2-methylenebutyryl)phenoxy]acetic acid (2.68 g., 0.01 mole), from Procedure I, is added to isopropyl mercaptan (0.76 g., 0.01 mole). The mixture is heated at 80–90° C. under reflux. Due to the volatility of the mercaptan, additional quantities of it are added to insure adequate mercaptan at the site of reaction. After a clear reaction mixture forms, the mixture is heated for an additional 5 minutes, the excess mercaptan is then evaporated and the residue allowed to cool whereupon it solidifies. After the solid is crystallized from a 1:2 mixture of benzene and hexane there is obtained 2.25 g. (48%) of [3-chloro-4-[2-(isopropylthiomethyl)butyryl] phenoxy]acetic acid, M.P. 77–79° C.

*Analysis.*—Calculated for: $C_{16}H_{21}ClO_4S$: C, 55.73; H, 6.14; Cl, 10.28. Found: C, 55.78; H, 5.73; Cl, 10.69.

The following example illustrates the reaction of a mercaptan and an (α-methyleneacylphenoxy)acetic acid in an organic solvent.

EXAMPLE 2

[3-chloro-4-[2-(ethylthiomethyl)butyryl]phenoxy] acetic acid

[3-chloro-4-(2-methylenebutyryl)phenoxy]acetic acid (4.03 g., 0.015 mole), from Procedure I, and ethyl mercaptan (12.4 g., 0.2 mole) are dissolved in dry ether (15 ml.) and the stoppered vessel containing the solution allowed to stand at room temperature for 48 hours. The volatile materials are evaporated at room temperature. The white solid that remains weighs 4.65 g. (70%) and has a melting point of 86–89° C. Several recrystallizations of this material from a mixture of benzene and cyclohexane give [3-chloro-4-[2-(ethylthiomethyl)butyryl] phenoxy]acetic acid, M.P. 88–90° C. (Corr.).

*Analysis.*—Calculated for: $C_{15}H_{19}ClO_4S$: C, 54.46; H, 5.79. Found: C, 54.94; H, 5.90.

Example 3 illustrates the reaction of a mercaptan and an (α-methyleneacylphenoxy)acetic acid in an aqueous solution.

EXAMPLE 3

[3-chloro-4-[2-(o-carboxyphenylthiomethyl)butyl] phenoxy]acetic acid

[3-chloro-4-(2-methylenebutyryl)phenoxy]acetic acid (2.68 g., 0.01 mole), prepared as described in Procedure I, is suspended in water (25 ml.) and sufficient 10% sodium bicarbonate solution is added to bring it into solution. In a separate vessel, thiosalicylic acid (0.01 mole) is suspended in water (5 ml.) and the solution made basic by addition of 10% sodium bicarbonate. The solutions are mixed and kept at 25–30° C. for 4 hours. Upon acidification with hydrochloric acid, a solid precipitates which, after crystallization from a 2:3 mixture of isopropyl alcohol and water, gives 2.25 g. of [3-chloro-4-[2-(o-carboxyphenylthiomethyl)butyryl]phenoxy]acetic acid, M.P. 172–173.5° C.

*Analysis.*—Calculated for: $C_{20}H_{19}ClO_6S$: C, 56.80; H, 4.53; Cl, 8.38. Found: C, 56.99; H, 4.75; Cl, 8.18.

The following example illustrates the reaction of an amphoteric mercaptan and an (α-methyleneacylphenoxy) acetic acid.

EXAMPLE 4

[3-chloro-4-[-2-(2-amino-2-carboxyethylthiomethyl) butyryl]phenoxy]acetic acid hydrochloride By replacing the thiosalicylic acid employed in Example 3 by an equimolecular quantity of cysteine hydrochloride and following substantially the same procedure described in Example 3, a gummy precipitate is obtained upon acidification with hydrochloric acid. This precipitate is dissolved upon addition of more acid and the water then is removed by lyophylization and the residue obtained is extracted with boiling absolute alcohol. The insoluble sodium chloride is removed by filtration, the alcoholic filtrate is concentrated and upon addition of absolute ether 3.3 g. of [3-chloro-4-[2-(2-amino-2-carboxyethylthiomethyl)butyryl]phenoxy]acetic acid hydrochloride separates as a colorless powder. The product melts indistinctly between 110–130° C. It is very soluble in alcohol and acetone and is soluble in acid or base but is insoluble in water.

*Analysis.*—Calculated for: $C_{16}H_{20}ClNO_6 \cdot HCl$: N, 3.28; S, 7.52. Found: N, 3.39; S, 7.85.

Example 5 illustrates the reaction of hydrogen sulfide with an (α-methyleneacylphenoxy)acetic acid.

EXAMPLE 5

Bis[2-(2-chloro-4-carboxymethoxybenzoyl)butyl]sulfide

[3-chloro-4-(2-methylenebutyryl)phenoxy]acetic acid (2.68 g., 0.01 mole), prepared as described in Procedure I, is suspended in water and dissolved by the addition of a minimum amount of 10% sodium bicarbonate solution. A slow stream of hydrogen sulfide is passed through the solution for 0.5 hour. The mixture then is acidified with hydrochloric acid and the oily precipitate that forms solidifies upon standing. The bis[2-chloro-4-carboxymethoxybenzoyl)butyl]sulfide is crystallized by dissolving in hot ethyl acetate and precipitating by the slow addition of ligroin. The compound has no definite melting point but decomposes over a range from 130–144° C.

*Analysis.*—Calculated for: $C_{26}H_{26}Cl_2O_8S$: C, 54.65; H, 4.94; Cl, 12.41. Found: C, 55.07; H, 4.93; Cl, 12.38.

The following examples describe the preparation of additional novel compounds of this invention.

EXAMPLE 6

1,4-bis[2-(2-chloro-4-carboxymethoxybenzoyl)butylthio]butane

By replacing the thiosalicylic acid employed in Example 3 by half of an equimolecular amount of 1,4-butanedithiol (0.61 g.) and stirring the heterogeneous mixture for one hour, the oily mercaptan gradually disappears as it adds to the [3-chloro-4-(2-methylenebutyryl)phenoxy]acetic acid. The reaction mixture then is acidified with hydrochloric acid and the solid that separates is crystallized from acetonitrile to give 1.7 g. of 1,4-bis[2-(2-chloro-4-carboxymethoxybenzoyl)butylthio]butane which decomposes when heated at about 118–122° C.

*Analysis.*—Calculated for: $C_{30}H_{36}Cl_2O_8S_2$: C, 54.62; H, 5.50; Cl, 10.75. Found: C, 54.04; H, 5.26; Cl, 10.66.

EXAMPLE 7

Bis[2-(2,3-dichloro-4-carboxymethoxybenzoyl)butyl]sulfide

By replacing the phenoxyacetic acid employed in Example 5 by an equimolecular quantity of [2,3-dichloro-4-(2-methylenebutyryl)-phenoxy]acetic acid (from Procedure III), and following substantially the same method described in Example 5, there is obtained an 18.8% yield of bis[2 - (2,3-dichloro-4-carboxymethoxybenzoyl)butyl]sulfide, M.P. 144.5–146° C.

*Analysis.*—Calculated for: $C_{26}H_{26}Cl_4O_8S$: C, 48.76; H, 4.09; Cl, 22.15. Found: C, 49.15; H, 3.98; Cl, 21.65.

EXAMPLE 8

[2,3-dimethyl-4-[2-(2-amino-2-carboxyethylthiomethyl)butyryl]phenoxy]-acetic acid hydrochloride By replacing the [3-chloro-4-(2-methylenebutyryl)phenoxy]-acetic acid and the thiosalicylic acid employed in Example 3 by equimolecular quantities of [2,3-dimethyl-4-(2-methylenebutyryl)phenoxy]-acetic acid (from Procedure IV) and cysteine hydrochloride, respectively, and following substantially the same procedure described in Example 3 (except the workup of the end product is effected by the procedure described in Example 4) there is obtained [2,3-dimethyl-4-[2-(2-amino-2-carboxyethylthiomethyl)butyryl]phenoxy] acetic acid hydrochloride.

EXAMPLE 9

[3-chloro-4-[2-(2,2-dichloroethylthiomethyl)butyryl]phenoxy]acetic acid

By replacing the thiosalicyclic acid employed in Example 3 by an equimolecular quantity of 2,2-dichloroethyl mercaptan, and following substantially the same procedure described in Example 3 there is obtained [3-chloro - 4 - [2-(2,2-dichloroethylthiomethyl)butyryl]phenoxy]acetic acid.

EXAMPLE 10

2-(2-amino-2-carboxyethylthio)-3-(2,3-dichloro-4-carboxymethoxybenzoyl)pentane hydrochloride Upon reaction of equimolecular quantities of cysteine hydrochloride and [2,3-dichloro-4-(2-ethylidenebutyryl)phenoxy]acetic acid (from Procedure V) by substantially the same procedure of Example 4, there is obtained 2-(2-amino - 2 - carboxyethylthio)-3-(2,3-dichloro-4-carboxymethoxybenzoyl)pentane hydrochloride.

EXAMPLE 11

{2,3 - dimethyl-4-[2-[2-(gamma - L - glutamylamino)-2-(N - carboxymethylcarbamoyl)ethylthiomethyl]butyryl]phenoxy}acetic acid hydrochloride Reaction of equimolecular quantities of glutathione hydrochloride and [2,3-dimethyl-4-(2-methylenebutyryl)phenoxy]acetic acid (from Procedure IV) by substantially the same method described in Example 4 gives the glutathione adduct of [2,3-dimethyl-4-(2-methylenebutyryl)phenoxy]acetic acid, i.e., {2,3-dimethyl-4-[2-[2-(gamma-L-glutamylamino) - 2 - (N-carboxymethylcarbamoyl)ethylthiomethyl]butyryl]-phenoxy}acetic acid hydrochloride.

EXAMPLE 12

[2,3-dichloro-4-[2-(methylthiomethyl)butyryl]phenoxy] acetic acid

[2,3-dichloro-4-(2-methylenebutyryl(phenoxy]acetic acid (3.03 g., 0.01 mole) is suspended in 25 ml. of water and sufficient 10% sodium bicarbonate solution to bring the compound into solution. The solution is stirred and a stream of gaseous methyl mercaptan is admitted below the surface of the solution for 15 minutes. The addition of methyl mercaptan then is continued while the stirred solution is heated on a steam bath for 1½ hours.

After cooling the reaction mixture to room temperature it is made acid to Congo-red test paper by the addition of 6 N hydrochloric acid. The resulting gum is extracted with ether and the combined extracts are dried over anhydrous magnesium sulfate. The ether is evaporated under reduced pressure to give a white solid, M.P. 82–86° C. Recrystallization from a mixture of benzene and cyclohexane gives 15.0 g. (86%) of [2,3-dichloro-4-[2-(methylthiomethyl)butyryl]phenoxy]acetic acid in the form of white prisms, M.P. 86–89° C.

*Analysis.*—Calculated for: $C_{14}H_{16}Cl_2O_4S$: C, 47.87; H, 4.59; S, 9.13. Found: C, 48.13; H, 4.56; S, 9.07.

EXAMPLE 13

{2,3-dichloro-4-[2-[(2-mercapto-3-hydroxypropyl)thiomethyl]butyryl]phenoxy}acetic acid, ammonium salt

[2,3-dichloro - 4 - (2-methylenebutyryl)phenoxy]acetic acid (3.03 g., 0.01 mole) is suspended in 90 ml. of water, and 28% ammonia water is added dropwise with shaking until the acid dissolves. To this is added a mixture of freshly distilled 2,3-dimercaptopropanol and one ml. of 28% ammonia water. The mixture is shaken thoroughly, heated at 80–90° C. for one hour and maintained at 20° C. for a 24-hour period. The solvent is evaporated at reduced pressure (20 mm.) at 40–45° C. The tan, oily solid is then dried in continuous vacuum at 0.5 mm. until it solidifies. The glassy solid thus obtained is triturated several times with absolute ether to obtain the ammonium salt of {2,3-dichloro-4-[2-[(2-mercapto-3-hydroxypropyl)thiomethyl]butyryl]phenoxy}acetic acid (2.9 g.).

*Analysis.*—Calculated for: $C_{16}H_{23}Cl_2NO_5S_2$: C, 43.24; H, 5.21; N, 3.15. Found: C, 43.65; H, 5.41; N, 2.92.

EXAMPLE 14

{2,3-dichloro-4[2-[(3-amino-3-carboxypropyl)thiomethyl]butyryl]phenoxy}acetic acid, disodium salt To [2,3-dichloro-4-(2-methylenebutyryl)phenoxy]acetic acid (3.032 g., 0.01 mole) dissolved in an oxygen-free water solution (30 ml.) and containing sodium bicarbonate (0.84 g., 0.01 mole), is added a solution of D,L-homocysteine (1.352 g., 0.01 mole) in 30 ml. of oxygen-free water containing sodium bicarbonate (0.84 g., 0.01 mole). The resulting solution is stirred at room temperature for one hour in an atmosphere of nitrogen and then concentrated to dryness under reduced pressure at ambient temperature. There is thus obtained 4.82 g. (100%) of the disodium salt of {2,3-dichloro-4-[2-[(3-amino-3-carboxypropyl)thiomethyl]butyryl]phenoxy}acetic acid, M.P. 163–168° C.

*Analysis.*—Calculated for: $C_{17}H_{19}Cl_2NNa_2O_6S$: C, 42.33; H, 3.97; S, 6.65. Found: C, 41.83; H, 4.11; S, 6.21.

EXAMPLE 15

{2,3-dichloro-4-[3-[(2-amino-2-carboxyethyl)thio]propionyl]phenoxy}acetic acid hydrochloride Step A: 2',3'-dichloro - 4' - hydroxyacetophenone.—A two-liter, four-necked, resin flask fitted with a mechanical stirrer, water-cooled condenser, calcium chloride drying tube and Gooch tubing is dried in a stream of nitrogen and charged with 2,3-dichloroanisole (71 g., 0.4 mole), carbon disulfide (440 ml.) and acetyl chloride (63 g., 0.8 mole).

Powdered aluminum chloride (106 g., 0.8 mole) is added via the Gooch tubing over a ten minute period. The mixture is stirred at room temperature for 5 hours and allowed to stand overnight.

The mixture is then heated one hour at 55° C. in a water bath, cooled to 25° C., treated with 53 g. of aluminum chloride and heated one hour at 55° C. The condenser is set for downward distillation, 350 ml. of heptane (dried over aluminum chloride) is added and the mixture is heated on a steam bath. The carbon disulfide is collected and heating is continued for 3 hours at reflux. After cooling, the heptane is decanted and the solid product is scraped onto 500 g. of ice containing 45 ml. of concentrated hydrochloric acid. The product is extracted with 600 ml. of ether in several portions, evaporated to dryness, treated with 1.2 liters of 5% aqueous sodium hydroxide and heated one hour at reflux. When cool the solution is extracted with ether and then acidified with concentrated hydrochloric acid to Congo-red. The product is extracted into 600 ml. of ether, dried over sodium sulfate and evaporated in vacuo. The residue is recrystallized from benzene to give 60 g. (73%) of 2',3'-dichloro-4'-hydroxyacetophenone which melts at 153–155° C.

*Analysis.*—Calculated for: $C_8H_6Cl_2O_2$: C, 46.86; H, 2.95. Found: C, 47.69; H, 3.01.

Step B: (2,3-dichloro-4-acetylphenoxy)acetic acid.—A one-liter, round-bottomed, three-necked flask fitted with a condenser and drying tube, nitrogen inlet tube and dropping funnel is charged with ethanol (450 ml.) and sodium metal (3.79 g., 0.165 mole). When the sodium has dissolved 2',3'-dichloro-4'-hydroxyacetophenone (30.75 g., 0.15 mole) and ethyl bromacetate (30.06 g., 0.18 mole) are added and the mixture is refluxed for two hours. A solution of potassium hydroxide (16.83 g., 0.3 mole) in water is added and the mixture is refluxed for one hour. The ethanol is distilled from the reaction mixture at atmospheric pressure. The residual aqueous solution is acidified (to Congo-red paper) with concentrated hydrochloric acid, cooled and extracted four times with ether (300 ml. portions). The combined ether extracts are dried over sodium sulfate and evaporated in vacuo. The residue is recrystallized from xylene (500 ml.) to give 32.2 g. (85%) of (2,3-dichloro-4-acetylphenoxy)acetic acid which melts at 154–156° C.

*Analysis.*—Calculated for: $C_{10}H_8Cl_2O_4$: C, 45.67; H, 3.07; Cl, 26.96. Found: C, 45.60; H, 2.92; Cl, 26.78.

Step C: [2,3 - dichloro-4-(3-dimethylaminopropionyl) phenoxy]-acetic acid hydrochloride.—(2,3-dichloro-4-acetylphenoxy)acetic acid (15.8 g., 0.06 mole), dimethylamine hydrochloride (4.94 g., 0.06 mole), paraformaldehyde (1.98 g., 0.066 mole) and glacial acetic acid (2 ml.) are combined and heated under anhydrous conditions on a steam bath for two hours with occasional application of a partial vacuum to remove the water formed in the reaction. The solid product is dissolved in 500 ml. of 90% aqueous ethanol, filtered and treated with 400 ml. of ether to give 9.9 g. (46%) of [2,3 - dichloro - 4 - (3-dimethylaminopropionyl)phenoxy]acetic acid hydrochloride, which melts at 194–196° C.

*Analysis.* — Calculated for: $C_{13}H_{15}Cl_2NO_4 \cdot HCl$: C, 43.78; H, 4.52; N, 3.93. Found: C, 43.91; H, 4.57; N, 3.71.

Step D: {2,3 - dichloro-4-[3-[(2-amino-2-carboxyethyl)thio]propionyl]phenoxy}acetic acid hydrochloride.—[2,3-dichloro - 4 - (3-dimethylaminopropionyl)phenoxy]acetic acid hydrochloride (835 mg., 0.00234 mole) is suspended in water (25 ml.) and, with vigorous stirring, treated with a solution of sodium bicarbonate (394 mg.) and water (10 ml.). Then a solution containing L-cysteine hydrochloride monohydrate (410 mg., 0.00234 mole) and sodium bicarbonate (394 mg.) in water (10 ml.) is added. The reactants are rapidly heated to 60° C. on a steam bath, then removed and allowed to cool to 25° C. The solution is treated with 4 N hydrochloric acid to obtain a pH of 1.5. The {2,3 - dichloro-4-[3-[(2-amino-2-carboxyethyl)thio]propionyl]phenoxy}acetic acid hydrochloride which separates (900 mg., 89%) is dissolved in 16 ml. of ethanol containing 0.5 ml. of 6 N hydrochloric acid, filtered and slowly treated with 220 ml. of ether. The product is filtered and dried, M.P. 176–177° C.

*Analysis.* — Calculated for: $C_{14}H_{15}Cl_2NO_6S \cdot HCl$: C, 38.86; H, 3.73; N, 3.24; Cl, 24.58. Found: C, 38.70; H, 3.93; N, 3.18; Cl, 24.74.

EXAMPLE 16

[2,3-dichloro-4-[2-(carboxymethylthiomethyl)butyryl]phenoxy]acetic acid

A mixture of [2,3 - dichloro-4-(2-methylenebutyryl)phenoxy]acetic acid (3.03 g., 0.01 mole) and thioglycolic acid (1.0 g., 0.0108 mole) are heated at 80–90° C. for five minutes. The viscous melt solidifies on cooling and the solid is crystallized from benzene containing a trace of ethyl acetate to obtain [2,3 - dichloro-4-[2-(carboxymethylthiomethyl)butyryl]phenoxy]acetic acid (2.0 g.). After thorough drying, the [2,3-dichloro-4-[2-(carboxymethylthiomethyl)butyryl]phenoxy]acetic acid melts at 128–129° C.

*Analysis.*—Calculated for: $C_{15}H_{16}Cl_2O_6S$: C, 45.59; H, 4.08; Cl, 17.95. Found: C, 45.54; H, 4.15; Cl, 18.07.

EXAMPLE 17

[2,3-dichloro-4-]2-(3-chloropropylthiomethyl)butyryl]phenoxy]acetic acid

[2,3 - dichloro - 4-(2-methylenebutyryl)phenoxy]acetic acid (3.03 g., 0.01 mole) and 3-chloropropylmercaptan (1.1 g., 0.01 mole) are mixed in a large test tube. The mixture is heated at 80–90° C. until the mixture fuses and the mixture is then heated for an additional five minutes. The mixture then is dissolved in 20 ml. of benzene and hexane is added at 20° C. until precipitation begins. The mixture is kept at 5° C. until precipitation is complete. After two recrystallizations from a solvent comprising four parts of benzene and three parts of hexane, 2.0 g. of [2,3 - dichloro - 4-[2-(3-chloropropylthiomethyl)butyryl]phenoxy]acetic acid is obtained, M.P. 74–76° C.

*Analysis.*—Calculated for: $C_{16}H_{19}Cl_3O_4S$: C, 46.45; H, 4.62. Found: C, 46.83; H, 4.70.

EXAMPLE 18

6,8 - bis - [2-(2,3-dichloro-4-carboxymethoxybenzoyl)butylthio]octanoic acid, trisodium salt To a solution of [2,3-dichloro-4-(2-methylenebutyryl)-phenoxy]acetic acid (4.547 g., 0.015 mole) in oxygen-free water (45 ml.) containing sodium bicarbonate (1.26 g., 0.015 mole), is added a solution of 6,8-dimercaptooctanoic acid (1.562 g., 0.0075 mole) in oxygen-free water (25 ml.) containing sodium bicarbonate (0.63 g., 0.0075 mole). The resulting clear solution is stirred at room temperature for one hour under nitrogen and then concentrated to dryness under reduced pressure. There is thus obtained 6.11 g. (100%) of the trisodium salt of 6,8-bis - [2 - (2,3 - dichloro - 4 - carboxymethoxybenzoyl)butylthio]octanoic acid in the form of a white solid, M.P. 190–195° C.

*Analysis.*—Calculated for C$_{34}$H$_{37}$Cl$_4$Na$_3$O$_{10}$S$_2$: C, 46.37; H, 4.24; S, 7.28. Found: C, 46.50; H, 4.56; S, 7.13.

EXAMPLE 19

[2,3 - dichloro - 4 - [2 - (2 - amino - 2 - carboxyethylthiomethyl)butyryl]phenoxy]-acetic acid hydrochloride Two solutions are prepared. The first is prepared by the addition of 3.03 g. (0.01 mole) of [2,3-dichloro-4-(2-methylenebutyryl)phenoxy]acetic acid to a solution of 0.84 g. (0.01 mole) of sodium bicarbonate in 30 ml. of water. The second is prepared by the addition of 1.76 g. (0.01 mole) of L-cysteine hydrochloride monohydrate to a solution of 1.68 g. (0.02 mole) of sodium bicarbonate in 30 ml. of water. The solutions are mixed and allowed to stand one hour at room temperature. Concentrated hydrochloric acid (3 ml.) is then added and the solution evaporated to dryness in a vacuum provided by a water aspirator. The residue is then dissolved in 60 ml. of isopropyl alcohol, the solution filtered and the filtrate diluted with 600 ml. of ether to precipitate the product. Purification is effected by dissolving the product in a mixture of 15 ml. of water and 2 ml. of 5% hydrochloric acid solution. The solution is filtered and 5 ml. of concentrated hydrochloric acid is added to precipitate [2,3-dichloro - 4 - (2 - (2-amino-2-carboxyethylthiomethyl)butyryl]phenoxy]-acetic acid hydrochloride. The product is collected and vacuum dried at 65° C. to obtain 1.7 g. of [2,3 - dichloro - 4 - [2-(2-amino-2-carboxyethylthiomethyl)butyryl]phenoxy]acetic acid hydrochloride, M.P. 183.5–186.5° C.

*Analysis.*—Calculated for C$_{16}$H$_{19}$Cl$_2$NO$_6$S·HCl: C, 41.74; H, 4.38; N, 3.04; Cl, 23.08. Found: C, 41.85; H, 4.50; N, 2.89; Cl, 22.88.

Other novel compounds of this invention prepared by substantially the same methods described in the preceding examples are identified in the following table. The procedure employed for the preparation of each compound is identified in the table. The table also identifies the (acylphenoxy)acetic acid,

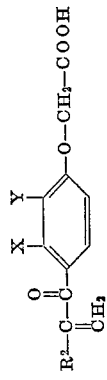

and the mercaptan, R—SH, reactants employed to make the novel products,

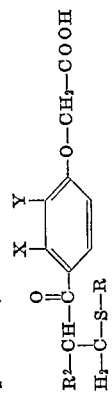

The radicals R$^2$, R, X and Y in the (acylphenoxy)acetic acid and mercaptan reactants are retained in the products formed and are identified in columns 2–5 of the table. The molar proportions, the reaction conditions and the method of isolation of each product is substantially the same as recited in the example referred to in the table.

TABLE $$R^2\text{-}\underset{\underset{CH_2}{\|}}{C}\text{-}\phantom{x}\underset{\underset{X}{\phantom{x}}}{\overset{\overset{Y}{\phantom{x}}}{\bigcirc}}\text{-}O\text{-}CH_2\text{-}COOH + R\text{-}SH \longrightarrow R^2\text{-}\underset{\underset{H_2C\text{-}S\text{-}R}{\|}}{CH}\text{-}\underset{\underset{X}{\phantom{x}}}{\overset{\overset{Y}{\phantom{x}}}{\bigcirc}}\text{-}O\text{-}CH_2\text{-}COOH$$

| Example No. | R$^2$ | X | Y | R | Method of preparation described Ex. No. | Yield, Percent | End Product M.P., °C. | Empirical Formula | Analysis | | | |
|---|---|---|---|---|---|---|---|---|---|---|---|---|
| | | | | | | | | | | C | H | Cl |
| 20 | C$_2$H$_5$— | Cl | H | CH$_3$CH$_2$CH$_2$— | 1 | 65 | 80–81.5 | C$_{16}$H$_{21}$ClO$_4$S | Calcd | 55.73 | 6.14 | 10.28 |
| | | | | | | | | | Found | 55.85 | 6.14 | 10.11 |
| 21 | C$_2$H$_5$— | Cl | H | CH$_2$=CHCH$_2$— | 1 | 52 | 73.5–75 | C$_{16}$H$_{19}$ClO$_4$S | Calcd | 56.05 | 5.59 | 10.34 |
| | | | | | | | | | Found | 56.19 | 5.62 | 10.52 |
| 22 | C$_2$H$_5$— | Cl | H | (CH$_3$)$_3$—C— | 1 | 34 | 108–110 | C$_{17}$H$_{23}$ClO$_4$S | Calcd | 56.89 | 6.46 | 9.88 |
| | | | | | | | | | Found | 57.36 | 6.31 | 9.74 |
| 23 | C$_2$H$_5$— | Cl | H | ![phenyl] | 1 | 75 | 67–69 | C$_{19}$H$_{23}$ClO$_4$S | Calcd | 59.28 | 6.56 | 9.21 |
| | | | | | | | | | Found | 59.17 | 6.22 | 9.35 |
| 24 | C$_2$H$_5$— | Cl | H | CH$_3$-phenyl | 1 | 80 | 69–71 | C$_{20}$H$_{21}$ClO$_4$S | Calcd | 61.22 | 5.38 | 9.03 |
| | | | | | | | | | Found | 60.99 | 5.58 | 9.20 |
| 25 | C$_2$H$_5$— | Cl | H | phenyl | 1 | 63 | 78–81 | C$_{19}$H$_{19}$ClO$_4$S | Calcd | 60.23 | 5.05 | 9.36 |
| | | | | | | | | | Found | 60.03 | 5.02 | 9.60 |
| 26 | C$_2$H$_5$— | Cl | H | HO—C(O)—(CH$_2$)$_2$— | 1 | 72 | Ca. 96 | C$_{16}$H$_{19}$Cl$_2$O$_4$S | Calcd | 51.27 | 5.11 | 9.46 |
| | | | | | | | | | Found | 51.12 | 5.04 | 9.35 |
| 27 | C$_2$H$_5$— | Cl | H | CH$_3$CO— | 1 | 52 | 86–87 | C$_{15}$H$_{17}$ClO$_5$S | Calcd | 52.25 | 4.97 | 10.28 |
| | | | | | | | | | Found | 52.41 | 5.09 | 10.50 |
| 28 | C$_2$H$_5$— | Cl | H | phenyl-CO— | 1 | 37 | 122–124 | C$_{20}$H$_{19}$ClO$_5$S | Calcd | 59.03 | 4.71 | 8.71 |
| | | | | | | | | | Found | 59.05 | 4.62 | 8.90 |

3,453,312

TABLE—Continued

| Example No.: | R² | X | Y | R | Method of preparation described Ex. No. | Yield, Percent | M.P., °C. | Empirical Formula | End Product | Analysis C | H | Cl |
|---|---|---|---|---|---|---|---|---|---|---|---|---|
| 29 | C₂H₅— | Cl | H | HO—C(=O)—CH₂— | 1 | | Ca. 75 | C₁₅H₁₇ClO₆S | Calcd<br>Found | 49.95<br>49.76 | 4.75<br>4.74 | 9.83<br>9.97 |
| 30 | C₂H₅— | Cl | H | HO—CH₂CH₂— | 1 | | Syrup | | Calcd<br>Found | | | |
| 31 | C₂H₅— | Cl | H | CH₃O—C(=O)—CH₂— | 1 | | Waxy solid | | Calcd<br>Found | | | |
| 32 | CH₃— | Cl | H | HO—C(=O)—CH₂— | 1 | | Ca. 102 | C₁₄H₁₅ClO₆S | Calcd<br>Found | 48.34<br>48.58 | 4.64<br>4.82 | 10.02<br>10.08 |
| 33 | C₂H₅— | Cl | Cl | (CH₃)₃—C— | 1 | 63 | 101.5–103 | C₁₇H₂₂Cl₂O₄S | Calcd<br>Found | 51.90<br>52.09 | 5.64<br>5.73 | |
| 34 | C₂H₅— | Cl | Cl | CH₂=CHCH₂— | 1 | 50 | Syrup | | Calcd<br>Found | | | |
| 35 | C₂H₅— | Cl | Cl | CH₃CO— | 1 | 66 | 98–102 | C₁₅H₁₆Cl₂O₅S | Calcd<br>Found | 47.50<br>48.03 | 4.25<br>4.19 | 18.70<br>18.50 |
| 36 | C₂H₅— | Cl | Cl | C₆H₅CH₂— | 1 | 33 | Syrup | | Calcd<br>Found | | | |
| 37 | C₂H₅— | Cl | Cl | cyclohexyl (H) | 1 | 86 | 114–115 | C₁₉H₂₄Cl₂O₄S | Calcd<br>Found | 54.42<br>54.78 | 5.77<br>5.94 | 16.91<br>16.96 |
| 38 | C₂H₅— | Cl | H | HO—C(=O)—CH—C(CH₃)₂—NH—COCH₃ | 4 | 33 | 152–153 | C₂₀H₂₅NClO₇S | Calcd<br>Found | 52.34<br>52.13 | 5.70<br>5.77 | 3.05<br>3.09 |
| 39 | C₂H₅— | Cl | H | HO—C(=O)—CH₂—NH—CO—CH₂—CH₂—<br>HO—C(=O)—CH—(CH₂)₂—CO—NH<br>NH₂·HCl | 4 | 53 | Ca. 115 | C₂₀H₃₀ClN₃O₁₀S·HCl | Calcd<br>Found | 45.10<br>45.61 | 5.10<br>6.31 | 11.58<br>10.53 |
| 40 | C₂H₅— | Cl | H | H₂NCH₂CH₂— | 4 | | Syrup | | Calcd<br>Found | | | |
| 41 | C₂H₅— | Cl | Cl | C₆H₄(COOH)— | 1 | 38 | Solution | C₂₀H₁₈Cl₂O₆S·1/2H₂O | Calcd<br>Found | 52.52<br>52.36 | 3.97<br>4.04 | 15.50<br>15.30 |
| 42 | C₂H₅— | Cl | Cl | NH₂CH₂—CH₂— | 14 | | Solution | C₁₅H₁₉Cl₂NO₄(Na Salt) | Calcd<br>Found | | | |

As each of the compounds of this invention can be incorporated in a dosage form similar to that described below, or in other dosage forms suitable for oral or parenteral administration which can be prepared by well known methods, only a few procedures are included herein to illustrate the preparation of representative dosage forms.

DRY-FILLED CAPSULES CONTAINING 50 MG. OF ACTIVE INGREDIENT PER CAPSULE

| | Per capsule, mg. |
|---|---|
| [3-chloro-4-[2-(2-amino-2-carboxyethylthiomethyl) butyryl]phenoxy]-acetic acid hydrochloride | 50 |
| Lactose | 174 |
| Magnesium stearate | 1 |
| | 225 |

The [3-chloro - 4-[2 - (2 - amino - 2 - carboxyethylthiomethyl)butyryl]-phenoxy]acetic acid hydrochloride is reduced to a No. 60 powder, lactose then is passed through a No. 60 bolting cloth onto the powder and the combined ingredients are admixed for 10 minutes and then filled into No. 2 dry gelatin capsules.

Similar dry-filled capsules can be prepared by replacing the [3 - chloro - 4 - [2 - (2 - amino - 2 - carboxyethylthiomethyl)butyryl]phenoxy]acetic acid hydrochloride by any of the other novel compounds of this invention.

PARENTERAL SOLUTION

A parenteral solution of the products of this invention advantageously can be prepared by adding sufficient pyrogen-free water to the lyophilized sodium salt of the desired product, which can be prepared by the following procedure:

Separate solutions of [2,3-dichloro-4-(2-methylenebutyryl)-phenoxy]acetic acid (Compound A) and of cysteine hydrochloride (Compound B) were prepared and then combined to form [2,3-dichloro-4-[2-(2-carboxy-2-aminoethylthiomethyl)butyryl]phenoxy] a c e t i c  a c i d (Compound C). These solutions, and their subsequent work-up, were prepared under nitrogen as follows:

Solution I

Compound A (1.03 g.) is suspended in 80 ml. of an aqueous solution containing

| Disodium salt of ethylenediaminetetraacetic acid | mg | 0.5 |
|---|---|---|
| Mannitol | g | 2.0 |
| Methyl p-hydroxybenzoate | mg | 1.5 |
| Propyl p-hydroxybenzoate | mg | 0.2 |

The pH is adjusted to 7.0 with sodium hydroxide whereupon compound A dissolves.

Solution II

Compound B is dissolved in pyrogen-free water (10 ml.) and the pH adjusted to 7.0 with sodium hydroxide.

Solution III

Upon combining the above two solutions, Compound C forms and remains dissolved. This solution is placed in a suitable container, frozen and lyophylized to give Compound C in the form of a powder admixed with the other agents which were added to make a suitable injectable preparation when reconstituted with water.

By replacing Compound B in the above procedure by an equivalent quantity of each of the following compounds, (1) thiosalicylic acid, (2) acetylcystein, (3) glutathione, and (4) thioacetic acid [1] and following substantially the same procedure there described, the following adducts are formed:

(1) [2,3-dichloro-4-[2-(2-carboxyphenylthiomethyl)-butyryl]phenoxy]acetic acid,
(2) [2,3-dichloro-4-[2-(2-acetylamino-2-carboxyethylthiomethyl)butyryl]phenoxy]acetic acid,
(3) glutathione adduct of [2,3-dichloro-4-(2-methylenebutyryl)phenoxy]acetic acid, and
(4) [2,3-dichloro-4-[2-(acetylthiomethyl)butyryl]-phenoxy]acetic acid A suitable parenteral dosage form also can be prepared by the following method:

Sorbitol solution, 70% (50 ml.) and pyrogen-free water (20 ml.) are combined in a suitable container. Sodium citrate (100 mg.) and Polysorbate 80 (100 mg., polyoxyethylene sorbitan monooleate) are added and after dissolving, benzyl alcohol (900 mg.) is dispersed in the solution. [2,3-dichloro-4-(2-methylenebutyryl)-phenoxy]acetic acid (5.15 g.) is suspended in this mixture and the pH adjusted to 7.0 by addition of sodium hydroxide solution forming the soluble sodium salt of [2,3-dichloro-4-(2-methylenebutyryl)phenoxy]-acetic acid. Cysteamine hydrochloride (2.05 g.) then is dissolved in pyrogen-free water (10 ml.) and the resulting solution then added slowly with agitation to the first prepared solution thus forming a suspension of the sodium salt of [2,3-dichloro-4-[2 - (2 - aminoethylthiomethyl)butyryl]phenoxy]acetic acid.

Parenteral solutions of the other novel products of this invention can be prepared by one or another or both methods described above or by other methods commonly employed for preparing parenteral dosage forms.

While the above examples describe the preparation of certain compounds which are illustrative of the novel compounds of this invention, and certain specific dosage forms suitable for administering the novel compounds, it is to be understood that the invention is not to be limited to the specific reaction conditions described for the preparation of these compounds or by the specific ingredients included in the pharmaceutical preparations, but is to be understood to embrace variations and modifications thereof which fall within the scope of the appended claims.

What is claimed is:

1. A member selected from the group consisting of a compound having the formula:

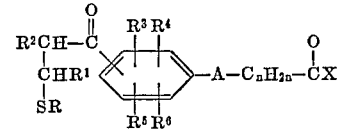

wherein A is O, S, SO or $SO_2$; R is lower alkyl, hydroxy lower alkyl, mercapto substituted hydroxy lower alkyl, monohalo substituted lower alkyl, dihalo substituted lower alkyl, carboxy lower alkyl, alkoxycarbonyl lower alkyl, lower alkanamido substituted carboxy lower alkyl, amino substituted lower alkyl, amino and carboxy substituted lower alkyl, lower alkenyl, lower cycloalkyl, phenyl, phenyl lower alkyl, carboxyphenyl, lower alkanoyl, benzoyl, 2-(gramma-L-glutamylamino)-2-(N-carboxymethylcarbamoyl)-lower alkyl or a radical having the formula:

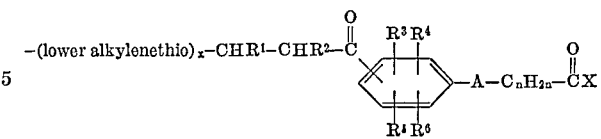

wherein A is as defined above, $x$ is 0 or 1 and $R^1$, $R^2$, $R^3$, $R^4$, $R^5$, $R^6$ and X are as defined below; $R^1$ is hydrogen or lower alkyl; $R^2$ is hydrogen or lower alkyl; $R^3$, $R^4$, $R^5$ and $R^6$ are similar or dissimilar members selected from hydrogen, halogen and lower alkyl; X is hydroxy, lower alkoxy, lower dialkylamino substituted lower alkoxy,

—NH—$NR^5R^6$

---
[1] The pH of solution II is not adjusted to 7.0 when using thioacetic acid. However, after combination of solutions I and II the pH of the resulting solution III is adjusted to pH 7.0.

wherein $R^5$ and $R^6$ are similar or dissimilar members selected from hydrogen and lower alkyl, $-NR^7R^8$ wherein $R^7$ and $R^8$ are similar or dissimilar members selected from hydrogen, lower alkyl and, taken together with the nitrogen atom to which they are attached, an heterocyclic ring selected from 1-pyrrolidinyl, piperidino and morpholino or, when X is hydroxy, the alkali metal or alkaline earth metal salts of the resulting acid and $n$ is an integer having a value of one to five; and the nontoxic, pharmacologically acceptable acid addition salts thereof.

2. A member selected from the group consisting of a compound having the formula:

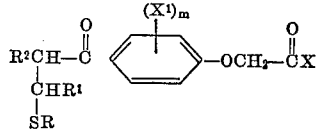

wherein R is lower alkyl, 2-carboxyphenyl, amino and carboxy substituted lower alkyl, monohalo substituted lower alkyl, dihalo substituted lower alkyl, hydroxy substituted lower alkyl, amino substituted lower alkyl, 2-(gramma-L-glutamylamino) - 2 - (N-carboxymethylcarbamoyl)ethyl, mercapto substituted hydroxy lower alkyl, carboxy substituted lower alkyl, lower alkenyl, phenyl, phenyl lower alkyl, lower alkanoyl, benzoyl, lower alkoxycarbonyl substituted lower alkyl, lower alkanamido substituted carboxy lower alkyl or a radical having the formula:

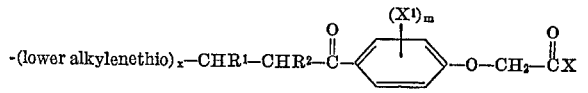

wherein $x$ is 0 or 1 and $R^1$, $R^2$, X, $X^1$ and $m$ are as defined below; $R^1$ is hydrogen or lower alkyl; $R^2$ is lower alkyl; X is hydroxy or the alkali metal salt of the resulting acid; $X^1$ is hydrogen, halogen or lower alkyl and $m$ is an integer having a value of one to two; and the nontoxic, pharmacologically acceptable acid addition salts thereof.

3. A member selected from the group consisting of a compound having the formula:

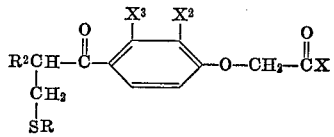

wherein R is lower alkyl, 2-amino-2-carboxyethyl, the sodium salt of 3-amino-3-carboxypropyl, benzyl, 2-(gamma - L - glutamylamino) - 2-(N-carboxymethylcarbamoyl)ethyl or 2-mercapto-3-hydroxypropyl; $R^2$ is lower alkyl; X is hydroxy or $-ONa$; $X^2$ is hydrogen, halogen or lower alkyl and $X^3$ is halogen or lower alkyl; and the nontoxic, pharmacologically acceptable acid addition salts thereof.

4. The hydrochloride of the product recited in claim 3 wherein R is 2-amino-2-carboxyethyl; $R^2$ is ethyl; X is hydroxy; $X^2$ is hydrogen and $X^3$ is chloro.

5. The hydrochloride of the product recited in claim 3 wherein R is 2-amino-2-carboxyethyl; $R^2$ is ethyl; X is hydroxy; $X^2$ is methyl and $X^3$ is methyl.

6. The ammonium salt of the product of claim 3 wherein R is 2-mercapto-3-hydroxypropyl; $R^2$ is ethyl; X is hydroxy; $X^2$ is chloro and $X^3$ is chloro.

7. The product of claim 3 wherein R is the sodium salt of 3-amino-3-carboxypropyl; $R^2$ is ethyl; X is $-ONa$; $X^2$ is chloro and $X^3$ is chloro.

8. The hydrochloride of the product recited in claim 3 wherein R is 2-amino-2-carboxyethyl; $R^2$ is ethyl; X is hydroxy; $X^2$ is chloro and $X^3$ is chloro.

9. The hydrochloride of the product recited in claim 3 wherein R is 2-(gamma-L-glutamylamino)-2-(N-carboxymethylcarbamoyl)ethyl; $R^2$ is ethyl; X is hydroxy; $X^2$ is hydrogen and $X^3$ is chloro.

10. [2,3 - dichloro - 4 - [2-(acetylthiomethyl)butyryl]phenoxy]acetic acid.

11. [2,3 - dichloro - 4-[2-(2-carboxyphenylthiomethyl)-butyryl]phenoxy]acetic acid.

12. [2,3 - dichloro - 4-[2-(2-aminoethylthiomethyl)-butyryl]phenoxy]acetic acid, sodium salt.

13. [2,3 - dichloro - 4 - [2-(3-chloropropylthiomethyl)-butyryl]phenoxy]acetic acid.

References Cited

UNITED STATES PATENTS 3,010,995 11/1961 Litvan et al. 260—521
3,010,996 11/1961 Litvan et al. 260—521

OTHER REFERENCES

Reid, Organic Chemistry of Bivalent Sulfur, vol. 11 (1960), pp. 29–37.

CHARLES B. PARKER, *Primary Examiner.*

D. R. PHILLIPS, *Assistant Examiner.*

U.S. Cl. X.R.

260—247.1, 247.2, 247.7, 293.4, 294, 294.3, 294.7, 326.3 326.5, 470, 516, 521, 558, 559, 590; 424—248, 267, 274, 301, 308, 309, 317, 324